United States Patent
Mueller et al.

(10) Patent No.: US 12,528,902 B2
(45) Date of Patent: Jan. 20, 2026

(54) BIODEGRADABLE GRAFT POLYMERS

(71) Applicant: BASF SE, Ludwigshafen am Rhein (DE)

(72) Inventors: Jan Ole Mueller, Ludwigshafen (DE); Ouidad Benlahmar, Ludwigshafen (DE); Jessica Eleanor Bean, Ludwigshafen (DE); Dawid Marczewski, Ludwigshafen (DE); Roland Boehn, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 590 days.

(21) Appl. No.: 17/760,468

(22) PCT Filed: Feb. 12, 2021

(86) PCT No.: PCT/EP2021/053446
§ 371 (c)(1),
(2) Date: Aug. 10, 2022

(87) PCT Pub. No.: WO2021/160795
PCT Pub. Date: Aug. 19, 2021

(65) Prior Publication Data
US 2023/0087697 A1 Mar. 23, 2023

(30) Foreign Application Priority Data
Feb. 14, 2020 (EP) ..................................... 20157383

(51) Int. Cl.
| C08F 287/00 | (2006.01) |
| C08L 51/08 | (2006.01) |
| C11D 3/00 | (2006.01) |
| C11D 3/37 | (2006.01) |

(52) U.S. Cl.
CPC ............ C08F 287/00 (2013.01); C08L 51/08 (2013.01); C11D 3/0036 (2013.01); C11D 3/3788 (2013.01); C08L 2205/03 (2013.01)

(58) Field of Classification Search
None
See application file for complete search history.

(56) References Cited

U.S. PATENT DOCUMENTS

| 5,318,719 A | 6/1994 | Hughes et al. | |
| 2005/0171287 A1 | 8/2005 | Baum et al. | |
| 2019/0390142 A1* | 12/2019 | Fossum | C11D 3/3707 |
| 2021/0115361 A1* | 4/2021 | Patterson | C11D 1/83 |

FOREIGN PATENT DOCUMENTS

| CN | 102030871 B | 10/2012 | |
| CN | 105330247 B | 9/2017 | |
| WO | 9119778 A1 | 12/1991 | |
| WO | WO-0018375 A1 * | 4/2000 | ............ A61K 47/34 |
| WO | 2003042262 A2 | 5/2003 | |
| WO | 2007138053 A1 | 12/2007 | |
| WO | 2019197315 A1 | 10/2019 | |

OTHER PUBLICATIONS

WO0018375A1 English Machine Translation (Year: None).*
European Search Report for EP Patent Application No. 20157383.9, Issued on Aug. 14, 2020, 3 pages.
Zhang, et al., "Poly (ethylene oxide)-b-poly (propylene oxide)-b-poly (ethylene oxide)-g-poly (vinyl pyrrolidone): Synthesis and characterization", Journal of colloid and interface science, vol. 285, Issue 1, May 1, 2005, pp. 80-85.
International Search Report and Written Opinion for PCT/EP2021/053446 issued on Jun. 1, 2021, 9 pages.

* cited by examiner

*Primary Examiner* — Randy P Gulakowski
*Assistant Examiner* — Holley Grace Hester
(74) *Attorney, Agent, or Firm* — Armstrong Teasdale LLP

(57) ABSTRACT

Disclosed herein are novel graft polymers including a block copolymer backbone (A) as a graft base having polymeric sidechains (B) grafted thereon. The polymeric sidechains (B) are obtainable by polymerization of a vinyl ester monomer (B1) and optionally N-vinylpyrrolidone as optional further monomer (B2). Most preferably, the block copolymer backbone (A) is a triblock copolymer of polyethylene oxide (PEG) and polypropylene oxide (PPG). Further disclosed herein is a process for obtaining such a graft polymer. Further disclosed herein is a method of using such a graft polymer within, for example, fabric and home care products. Additionally disclosed herein are fabric and home care products containing such a graft polymer.

16 Claims, No Drawings

BIODEGRADABLE GRAFT POLYMERS

CROSS-REFERENCE TO RELATED APPLICATIONS

This application is a U.S. National Phase Application of International Patent Application No. PCT/EP2021/053446, filed Feb. 12, 2021, which claims priority to European Patent Application No. 20157383.9, filed Feb. 14, 2020, each of which is hereby incorporated by reference herein.

DESCRIPTION

The present invention relates to novel graft polymers comprising a block copolymer backbone (A) as a graft base having polymeric sidechains (B) grafted thereon. The polymeric sidechains (B) are obtainable by polymerization of at least one vinyl ester monomer (B1) and optionally N-vinylpyrrolidone as optional further monomer (B2). Most preferably, the block copolymer backbone (A) is a triblock copolymer of polyethylene oxide (PEG) and polypropylene oxide (PPG). The present invention further relates to a process for obtaining such a graft polymer, the process is preferably carried out by free-radical polymerization. Furthermore, the present invention relates to the use of such a graft polymer within, for example, fabric and home care products. Another subject-matter of the present invention are fabric and home care products as such, containing such a graft polymer.

Various states have already introduced initiatives to ban microplastics especially in cosmetic products. Beyond this ban of insoluble microplastic there is an intense dialog on future requirements for soluble polymers used in consumer products. It is therefore highly desirable to identify new better biodegradable ingredients for such applications. This problem is predominantly serious for polymers produced by radical polymerization based on carbon-only backbones (a backbone not containing heteroatoms such as oxygen), since a carbon-only backbone is particularly difficult to degrade for microorganisms. Even radically produced graft polymers of industrial importance with a polyethylene glycol backbone show only limited biodegradation in waste water. However, the polymers described by the current Invention are preferably produced by radical graft polymerization and provide enhanced biodegradation properties compared to the state-of-the-art.

WO 2007/138053 discloses amphiphilic graft polymers based on water-soluble polyalkylene oxides (A) as a graft base and side chains formed by polymerization of a vinyl ester component (B), said polymers having an average of <one graft site per 50 alkylene oxide units and mean molar masses M of from 3000 to 100000. However, WO 2007/138053 does not describe any backbone material based on block copolymers. Furthermore, WO 2007/138053 does not contain any disclosure in respect of the biodegradability (also named "biodegradation") of the respective graft polymers disclosed therein.

Y. Zhang et al. J. Coll. Inter. Sci 2005, 285, 80, relates to the synthesis and characterization of specific grafted polymers based on a Pluronic™-type backbone. Pluronic poly (ethylene oxide)-b-poly(propylene oxide)-b-poly(ethylene oxide) (PEO-PPO-PEO) block copolymers are grafted with poly(vinyl pyrrolidone) by free radical polymerization of vinyl pyrrolidone with simultaneous chain transfer to the Pluronic in dioxane. However, Y. Zhang does not disclose that polymeric sidechains of the respective graft polymer are based on vinyl ester monomers. Furthermore, Y. Zhang does not have any disclosure in respect of the biodegradability of the graft polymers disclosed therein. Y. Zhang also does not contain any disclosure about the use of such graft polymer within fabric and home care products.

WO 03/042262 relates to graft polymers comprising (A) a polymer graft skeleton with no mono-ethylenic unsaturated units and (B) polymer sidechains formed from copolymers of two different mono-ethylenic unsaturated monomers (B1) and (B2), each comprising a nitrogen-containing heterocycle, whereby the proportion of the sidechains (B) amounts to 35 to 55 wt.-% of the total polymer. However, the graft polymers according to WO 03/042262 are not based on vinyl ester monomers within the respective polymer sidechains grafted onto the backbone. Beyond that, WO 03/042262 does not have any disclosure in connection with the biodegradability of the graft polymers disclosed therein.

U.S. Pat. No. 5,318,719 relates to a novel class of biodegradable water-soluble graft copolymers having building, anti-filming, dispersing and threshold crystal inhibiting properties comprising (a) an acid functional monomer and optionally (b) other water-soluble, monoethylenically unsaturated monomers copolymerizable with (a) grafted to a biodegradable substrate comprising polyalkylene oxides and/or polyalkoxylated materials. However, U.S. Pat. No. 5,318,719 does not disclose the use of a block copolymer backbone within the respective graft polymers. Furthermore, the respective sidechain of said graft polymers mandatorily comprises a high amount of acid-functional monomers such as acrylic acid or methacrylic acid. Such type of acid monomers are not useful within the context of the present invention.

The object of the present invention is to provide novel graft polymers. Furthermore, these novel graft polymers should have beneficial properties in respect of biodegradability and/or their washing behavior, when being employed within compositions such as cleaning compositions.

This object is achieved by a graft polymer comprising
(A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x is from 3 to 10, and
(B) polymeric sidechains grafted onto the block copolymer backbone, wherein said polymeric sidechains (B) are obtainable by polymerization of at least one vinyl ester monomer (B1) and optionally N-vinylpyrrolidone as optional further monomer (B2).

The graft polymers according to the present invention may be used, for example, within cleaning compositions and/or fabric and home care products. They lead to an at least comparable and preferably even improved anti redeposition and cleaning performance within such compositions or products, for example in respect of redeposition of soils and removing of stains, compared to corresponding polymers or graft polymers according to the prior art. Beyond that, the graft polymers according to the present invention lead to an improved biodegradability when being employed within such compositions or products, for example within cleaning compositions and/or fabric and home care products.

Graft polymers with enhanced biodegradation according to the current invention can be used advantageously in washing and cleaning compositions, where they support the removal of hydrophobic soils from textile or hard surfaces by the surfactants and thus improve the washing and cleaning performances of the formulations. Moreover, they bring about better dispersion of the removed soil in the washing or cleaning liquor and prevent its redeposition onto the surfaces of the washed or cleaned materials.

The term "block copolymer (backbone)" as used herein means that the respective polymer comprises at least two (two or more) homopolymer subunits (blocks) linked by covalent bonds. Two block copolymers have two distinct blocks (homopolymer subunits), whereas triblock copolymers have, by consequence, three distinct blocks (homopolymer subunits) and so on. The number of individual blocks within such block copolymers is not limited, by consequence, a "n-block copolymer" comprises n distinct blocks (homopolymer subunits).

Within the individual blocks (homopolymer subunits) the size/length of such a block may vary. The smallest length/size of a block is based on two individual monomers (as a minimum). The understanding of the term "block copolymer" is defined in further detail below, in particular with the definition of "triblock copolymer" according to general formula (A1) or general formula (A2).

The invention is specified in more detail as follows.

The first subject-matter of the present invention relates to a graft polymer comprising
(A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x is from 3 to 10, and
(B) polymeric sidechains grafted onto the block copolymer backbone, wherein said polymeric sidechains (B) are obtainable by polymerization of at least one vinyl ester monomer (B1) and optionally N-vinylpyrrolidone as optional further monomer (B2).

The ratio of the block copolymer backbone (A) versus the polymeric side chains (B) within the graft polymers according to the present invention is not limited to specific values. Any ratio known to a person skilled in the art can be employed. However, it is understood that the graft polymers comprise more than 0.2% by weight of the polymeric sidechains (B) (in relation to the total weight of the graft polymer). Preferably the graft polymers comprise more than 1% by weight of the polymeric sidechains (B) (in relation to the total weight of the graft polymer). More preferably, graft polymers comprise 20 to 95% by weight of the block copolymer backbone (A) and 5 to 80% by weight of the polymeric sidechains (B) (in relation to the total weight of the graft polymer).

Preferably the graft polymer comprises 40 to 85% by weight, more preferably 50 to 80% by weight, even more preferably 55 to 75% by weight of the block copolymer backbone (A), and preferably 15 to 60% by weight, more preferably 20 to 50% by weight, even more preferably-20 to 50% by weight, even more preferably 25 to 45% by weight of the polymeric sidechains (B) (in relation to the total weight of the graft polymer).

Block copolymer backbones (A) as such are known to a person skilled in the art as well as methods for producing such block copolymers backbones. Various types of such block copolymer backbones are commercially available, for example under the trademark series "Pluronic" (BASF SE, Ludwigshafen, Germany). Specific examples are Pluronic PE 6100, Pluronic PE 6800 or Pluronic PE 3100.

Suitable block copolymer backbones (A) to be employed within the present invention are described, for example, within EP-A 0 362 688. Within the present invention, it is preferred that the respective monomer to be employed for preparing the individual blocks of the block copolymer backbone (A) are added in sequence. However, it is possible at the transition of the feed from one monomer to the other to produce so called "dirty structures" wherein at the edge/border of the respective block a small number of monomers of the respective neighboring block may be contained within the individual block to be considered. However, it is preferred that the block copolymer backbones (A) according to the present invention do not contain any so called "dirty structures" or "dirty passages" at the respective border of the blocks.

In respect of the block copolymer backbone (A) of the graft polymers according to the present invention, it is preferred that the block copolymer backbone (A) is obtainable by polymerization of
i) at least two monomers selected from the group of ethylene oxide, 1,2 propylene oxide or 1,2-butylene oxide, preferably by polymerization of ethylene oxide and 1,2-propylene oxide as monomers, and/or
ii) one of the at least two monomers employed is ethylene oxide, preferably the second monomer employed is 1,2-propylene oxide, and/or
iii) the number (x) of individual (alkylene oxide) blocks within the block copolymer backbone (A) is an integer, wherein x has a value from 3 to 5, more preferably x is 3.

In case x is an even number, typically the graft polymer comprises an end capping group. Suitable end capping groups is described in detail below.

The graft polymer according to the present invention may have any molecular weight known to a person skilled in the art. However, it is preferred that the graft polymer has a weight average molecular weight $M_w$ of from 1000 to 100 000 g/mol, preferably from 2000 to 45000 g/mol and more preferably from 3000 to 30 000 g/mol.

The graft polymers according to the present invention preferably have a low polydispersity. It is preferred that the graft polymer has a polydispersity $M_w/M_n$ of <3, preferably <2.5, more preferably <2.3, and most preferably in the range from 1.0 to 2.2 (with $M_w$=weight average molecular weight and $M_n$=number average molecular weight; with polydispersity being without unit $[^g/_{mol}/^g/_{mol}]$). The respective values of $M_w$ and/or $M_n$ can be determined as described within the experimental section below.

The block copolymer backbone (A) contained within the graft polymer according to the present invention may either be capped or not capped (uncapped) at the respective end-groups of the backbone. By consequence, within the present invention, it is possible that the block copolymer backbone (A) is optionally capped at one or both end-groups, preferably the block copolymer backbone (A) is not capped at both end-groups or, if the block copolymer backbone (A) is capped, the capping is done by $C_1$-$C_{25}$-alkyl groups.

In one embodiment of the present invention, it is preferred that the block copolymer backbone (A) is a triblock copolymer of polyethylene oxide (PEG) and polypropylene oxide (PPG).

Within the context of the present invention, it is generally preferred that the graft polymer has a block copolymer backbone (A) having the structure according to formula (A1) or formula (A2) with formula (A1) is defined as follows:

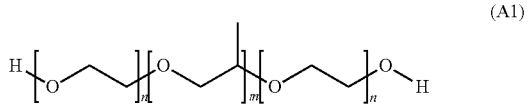

(A1)

with n is an integer in the range of 2 to 100, preferably of 3 to 80, and m is an integer in the range of 2 to 100, preferably of 10 to 70, more preferably of 14 to 54, or formula (A2) is defined as follows:

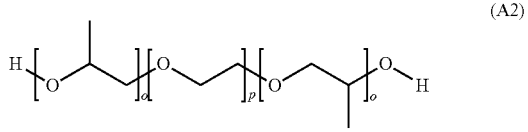

(A2)

with o is an integer in the range of 2 to 100, preferably of 5 to 50, more preferably of 8 to 27, and p is an integer in the range of 2 to 100, preferably of 5 to 50, more preferably of 7 to 24.

Block copolymers (A) can contain different levels of hydrophilic ethylene glycol which influences the overall properties of the graft polymer. The total EO content (% EO) describing the total amount of ethylene glycol units in the block copolymer is defined as:

$$\% \, EO = m(EO)/(m(\text{total backbone}))$$

wherein m(EO) is the total mass of the ethylene glycol units and m(total backbone) is the total mass of the backbone. The block copolymers can be low, medium or high respective % EO which has effects on the biodegradation properties as well as the performance in laundry formulations. The ranges are defined as follows:

Low: 5-20% EO
Medium: 21-50% EO
High: 51-90% EO

In respect of the polymeric sidechains (B) contained within the graft polymer according to the present invention, it is preferred that the polymeric sidechains (B) are obtained by radical polymerization and/or the at least one vinyl ester monomer (B1) is vinyl acetate or vinyl propionate, more preferably vinyl acetate.

As vinyl ester monomer (B1) any further vinyl ester besides vinyl acetate or vinyl propionate may be employed which are known to a person skilled in the art, such as vinyl valerate, vinyl pivalate, vinyl neodecanoate, vinyl decanoate or vinyl benzoate. In case N-vinylpyrrolidone as optional further monomer (B2) is employed for preparing the polymeric sidechains (B) within the graft polymers according to the present invention, the ratio of the mandatory vinyl ester monomer (B1) versus said further monomer (B2) may have any value known to a person skilled in the art. However, the amount of vinyl ester monomer (B1) is usually not smaller than 1% by weight (in relation to the sum of (B1) and (B2)).

By consequence, the polymeric sidechains (B) may be obtained by, preferably, radical polymerization of 1 to 100% by weight of monomer (B1), which is most preferably vinyl acetate, and 0 to 99% by weight of N-vinylpyrrolidone as optional further monomer (B2).

However, it is preferred within the context of the present invention that the polymeric sidechains (B) are obtained by free radical polymerization of (B1) 10 to 100% by weight (in relation to the sum of (B1) and (B2)) of at least one vinyl ester monomer (B1), preferably 50 to 100% by weight, more preferably 75 to 100% by weight, and (B2) 0 to 90% by weight (in relation to the sum of (B1) and (B2)) of N-vinylpyrrolidone as further monomer (B2), preferably 0 to 50% by weight, more preferably 0 to 25% by weight.

The graft polymers of the invention may contain a certain amount of ungrafted polymers ("ungrafted side chains") made of vinyl ester(s), e.g. polyvinylacetate in case only vinyl acetate is employed, and/or—when further monomers are employed—homo- and copolymers of vinyl ester(s) with the other monomers. The amount of such ungrafted vinylacetate-homo- and copolymers may be high or low, depending on the reaction conditions, but is preferably to be lowered and thus low. By this lowering, the amount of grafted side chains is preferably increased. Such lowering can be achieved by suitable reaction conditions, such as dosing of vinyl ester and radical initiator and their relative amounts and also in relation to the amount of backbone being present. This is generally known to a person of skill in the present field.

The inventive graft polymers maybe characterized by their degree of grafting (number of graft sites of the polymeric sidechains (B) on the blockcopolymer backbone (A)). The degree of graft may be high or low, depending on the reaction conditions. Preferably, the degree of grafting is low.

This adjustment of the degree of grafting and this amounts of ungrafted polymers can be used to optimize the performance in areas of specific interest, e.g. certain (e.g. detergent-) formulations, application areas or desired cleaning etc. performance.

It is even more preferred within the context of the present invention that the polymeric sidechains (B) are obtained by radical polymerization of 100% by weight (in relation to the total amount of monomers employed) of at least one vinyl ester monomer (B1), which is preferably vinyl acetate or vinyl propionate, more preferably vinyl acetate.

In another embodiment of the present invention, the polymeric sidechains (B) of the graft polymer according to the present invention are fully or at least partially hydrolyzed after the graft polymer as such is obtained. This means that the full or at least partial hydrolyzation of the polymeric sidechains (B) of the graft polymer is carried out after the polymerization process of the polymeric sidechains (B) is finished.

Due to this full or at least partial hydrolyzation of the polymeric sidechains (B) of the graft polymers according to the present invention, the respective sidechain units originating from the at least one vinyl ester monomer (B1) are changed from the respective ester function into the alcohol function within the polymeric sidechain (B). It has to be noted that the corresponding vinyl alcohol is not suitable to be employed as monomer within the polymerization process of the polymeric sidechains (B) due to stability aspects. In order to obtain an alcohol function (hydroxy substituent) within the polymeric sidechains (B) of the graft polymers according to the present invention, the alcohol function is typically introduced by hydrolyzing the ester function of the sidechains.

From a theoretical point of view, each ester function of the polymeric sidechain (B) may be replaced by an alcohol function (hydroxy group). In such a case, the polymeric sidechain is fully hydrolyzed (saponified). It is to be noted that in case N-vinylpyrrolidone is employed as further monomer, typically no hydrolyzation takes place at those units of the polymeric sidechain (B) which originates from N-pyrrolidone employed as further monomer (B).

The hydrolysis can be carried out by any method known to a person skilled in the art. For example, the hydrolysis can be induced by addition of a suitable base, such as sodium hydroxide or potassium hydroxide.

However, within this embodiment of the present invention it is preferred that the hydrolyzation of the polymeric sidechains (B) is only carried out partially, for example, to an extend of up to 20 wt. %, 40 wt. % or 60 wt. % (in relation to the total weight of the polymeric sidechains).

Within this embodiment, it is preferred that the polymeric sidechains (B) are fully or partially hydrolyzed after polymerization, preferably to an extent of up to 50% in relation to the amount of the at least one vinyl ester monomer (B1) employed within the polymerization.

However, in a preferred embodiment of this invention, the polymeric sidechains (B) are not hydrolyzed after polymerization.

Within the context of the present invention, it is preferred that no other monomers besides those as defined above in connection with the at least one vinyl ester monomer (B1) and the optionally present N-vinylpyrrolidone as optional further monomer (B2) are employed within the respective polymerization process for obtaining the polymeric sidechains (B). However, if any further polymeric monomers besides the monomers according to (B1) and optionally (B2) are present, such monomers (other than B1 and B2) are present in an amount of less than 1% of the total amount of monomers employed for obtaining the polymeric sidechains (B). Preferably, the amount of said additional monomers is less than 0.5% by weight, even more preferably less than 0.01% by weight, most preferably, there is a total absence of any additional monomer besides the monomers (B1) and optionally (B2).

Within the present invention, it is particularly preferred that no monomers are employed comprising an acid function. In particular, the monomers employed for obtaining the polymeric sidechains (B) of the graft polymers according to the present invention do not comprise any acid-functional monomers selected from acrylic acid, methacrylic acid, maleic acid, itaconic acid, crotonic acid, vinyl-acetic acid or acryloxy-propionic acid.

Inventive polymers have at least one of the following properties, preferably two or more, to be successfully employed in the various fields of applications targeted with this present invention:
a) Biodegradation of a certain level, such biodegradation being tested as defined elsewhere within this specification. To exhibit a commercially useful biodegradation the percentage of biodegradation should be at least 25 percent, preferably at least 30%, more preferably at least 40%, and even more preferably at least 50%, such as 35, 45, 55, 60, 65, 75, 80, 85 or more up to 100% (all percentages in weight % based on the total solid content) within 28 days.
b) Water-solubility of the polymers should be present to a certain extent, to be able to employ the polymers within the aqueous environment typically present in the fields of applications as generally targeted with this present invention. Preferably inventive polymers should exhibit a medium to good, more preferably a very good solubility in the environment of an aqueous formulation as typically employed in such fields for the various kinds of formulations, e.g. dish washing, automatic dishwashing, hard surface cleaning, fabric cleaning, fabric care, cosmetic formulations etc.
c) Viscosities of the polymer solutions should be such that at reasonably high solid concentrations of the polymer as to be handled in and after production and to be provided to the user, which could be e.g. as a "pure" (then typically liquid) product, dissolved in a solvent, typically an aqueous solution containing water and organic solvents, only water or only organic solvents, the viscosity of such polymer or polymer solution being in a range that allows typical technical process steps such as pouring, pumping, dosing etc. Hence, the viscosities should be preferably in a range of about up to less than 4000 mPas, more preferably up to 3500 mPas, even more preferably up to 3000 mPas, such as up to 4500, 3750, 3250, 2750 or even 2600 or below such as 2500, 2000, 1750, 1500, 1250, 1000, 750, 500, 250, 200, 150, or 100 mPas, at concentrations of the polymer (based on the total solid content of the polymer in solution, as defined by weight percent of the dry polymer within the total weight of the polymer solution) of preferably at least 10 wt. %, more preferably at least 20, and even more preferably at least 40 wt. %, and most preferably at least 50 wt. %, such as at least 60, 70, 80 or even 90 wt. %. The viscosity may be measured at either 25° C. or at elevated temperature, e.g. temperatures of 50 or even 60° C. By this a suitable handling of the polymer solutions in commercial scales is possible. It is of course evident that depending on the amount of solvent being added the viscosity is lower when the amount of solvent increases and vice versa, thus allowing for adjustment in case desired. It is also evident that the viscosity being measured depends on the temperature at which it is being measured, e.g. the viscosity of a given polymer with a given solid content of e.g. 80 wt. % will be higher when measured at lower temperature and lower when measured at a higher temperature. In a preferred embodiment the solid content is in between 70 and 99 wt. %, more preferably in between 75 and 85 wt. %, with no additional solvent being added but the polymer as prepared. In a more preferred embodiment, the solid content is in between 70 and 99 wt. %, more preferably in between 75 and 95 wt. %, with no additional solvent being added but the polymer as prepared, and the viscosity is lower than 3000 mPas, more preferably 3250, or even below 2750, 2600, 2500, 2000, 1750, 1500, 1250, 1000, 750, 500 or even 250 mPas, when measured at 60° C.

To achieve these requirements, the following guidance can be given on how to achieve such properties of the inventive polymers:

Biodegradability increases generally with at least one of the following conditions:
a lower molecular weight of the block copolymer backbone (A) compared to higher molecular weight;
lower weight percentage of polymeric side chains (monomer B) being grafted onto the backbone compared to higher weight percentages;
choosing the backbone structure A2 over A1;

weight percentage of ethylene oxide (EO)-moiety to total alkylene oxide moiety present in the backbone (A) of below 80% and lowering further, but not below 10%.

Preferable graft polymers are obtained using at least one of the following conditions:
I) a block copolymer-backbone (A) with a number average molecular weight $M_n$ of below 3650 g/mol, preferably below 3500, more preferably below 3000 g/mol, even more preferably below 2750 g/mol and most preferably of below 2500 g/mol;
II) weight percentage of polymeric side chains of the graft polymers (monomer content (B) to total weight of graft polymer) of from more than 10, preferably at least 20, more preferably at least 40, and even more preferably at least 35%, to not more than 70, more preferably not more than 65, even more preferably not more than 60, most preferably at most 55% and at most 50% and less;
III) graft polymers having a backbone structure A2;
IV) graft polymers have a backbone having a weight percentage of ethylene oxide (EO)-moiety to total alkylene oxide moiety present in the backbone (A) of below 80% and lowering further, but not below 10%.

More preferable graft polymers are obtained using one of the following combinations of conditions: ("I", "II" etc. as being defined in the preceding paragraph)
I plus II,
I+III
I+II+III
I+II+III+DIV Even more preferable graft polymers are obtained using one of the following combinations of conditions:
I+II
I+II+III The most preferred graft polymers are obtained using the following combination of conditions:
I+II+III In one preferred embodiment of the present invention the graft polymer is a polymer wherein the number average molecular weight $M_n$ of the tri-block copolymer backbone (A) is lower than 6000 g/mol, preferably lower than 5000 g/mol, more preferably lower than 3650 g/mol and even more preferably lower than 3000 g/mol, and the percentage by weight of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer).

In another preferred embodiment of the present invention the graft polymer is a polymer wherein the number average molecular weight $M_n$ of the tri-block copolymer backbone (A) is lower than 6000 g/mol, preferably lower than 5000 g/mol, more preferably lower than 3650 g/mol and even more preferably lower than 3000 g/mol, and most preferably lower than 2500 g/mol, and the backbone has the structure A2, and the percentage by weight of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer).

As further criteria of course the individual performance of a specific polymer needs to be evaluated and thus ranked for each individual formulation in a specific field of application. Due to the broad usefulness of the inventive polymers an exhaustive overview is not possible, but the present specification and examples give a guidance on how to prepare and select useful polymers of desired properties and how to tune the properties to the desired needs. One such criteria for the area of home care and especially fabric care of course it he performance upon washing, e.g. subjecting a certain material exhibiting stains of certain materials to a defined washing procedure.

The examples give some guidance for the application for washing of fabrics, i.e. the general area of fabric care.

Depending on the individual needs for a polymer exhibiting a defined degree of biodegradation, water solubility and viscosity (i.e. handling properties) the general and specific teachings herein—without being intended to be limited to the specific examples being given—will guide on how to obtain such polymer.

Another subject-matter of the present invention is a process for preparing the inventive graft polymers as described above. Within this process for obtaining at least one graft polymer according to the present invention, at least one monomer (B1) and optionally N-vinylpyrrolidone as optional monomer (B2) are polymerized in the presence of at least one block copolymer backbone (A).

It has to be noted that the grafting process as such, wherein a polymeric backbone, such as a block copolymer backbone, is grafted with polymeric sidechains, is known to a person skilled in the art. Any process known to the skilled person in this respect can be employed within the present invention.

Within the process of the present invention, it is preferred that the polymeric sidechains (B) are obtained by radical polymerization.

The radical polymerization as such is also known to a skilled person. The person skilled in the art also knows that the inventive process can be carried out in the presence of a radical-forming initial (C) and/or at least one solvent (D). The skilled person knows the respective components as such.

The term "radical polymerization" as used within the context of the present invention comprises besides the free radical polymerization also variants thereof, such as controlled radical polymerization. Suitable control mechanisms are RAFT, NMP or ATRP, which are each known to the skilled person, including suitable control agents.

It is even more preferred that a process according to the present invention is carried out by a method comprising the polymerization of at least one monomer (B1) selected from vinyl acetate or vinyl propionate and optionally N-vinylpyrrolidone as optional further monomer (B2) in order to obtain the polymer sidechains (B) in the presence of at least one block copolymer backbone (A), a free radical-forming initiator (C) and, if desired, up to 50% by weight, based on the sum of components (A), (B1), optionally (B2), and (C) of at least one organic solvent (D), at a mean polymerization temperature at which the initiator (C) has a decomposition half-life of from 40 to 500 min, in such a way that the fraction of unconverted graft monomers (B1) and optionally (B2) and initiator (C) in the reaction mixture is constantly kept in a quantitative deficiency relative to the block copolymer backbone (A).

The amount of ((free) radical-forming) initiator (C) is preferably from 0.1 to 5% by weight, in particular from 0.3 to 3.5% by weight, based in each case on the polymeric sidechains (B).

For the process according to the invention, it is preferred that the steady-state concentration of radicals present at the mean polymerization temperature is substantially constant and the graft monomers (B1) or (B2) are present in the reaction mixture constantly only in low concentration (for example of not more than 5% by weight). This allows the reaction to be controlled, and graft polymers can be prepared in a controlled manner with the desired low polydispersity.

The term "mean polymerization temperature" is intended to mean here that, although the process is substantially isothermal, there may, owing to the exothermicity of the reaction, be temperature variations which are preferably kept within the range of +/−10° C., more preferably in the range of +/−5° C.

According to the invention, the (radical-forming) initiator (C) at the mean polymerization temperature should have a decomposition half-life of from 40 to 500 min, preferably from 50 to 400 min and more preferably from 60 to 300 min.

According to the invention, the initiator (C) and the graft monomers (B2) and/or (B2) are advantageously added in such a way that a low and substantially constant concentration of undecomposed initiator and graft monomers (B1) and/or (B2) is present in the reaction mixture. The proportion of undecomposed initiator in the overall reaction mixture is preferably 15% by weight, in particular 10% by weight, based on the total amount of initiator metered in during the monomer addition.

The mean polymerization temperature is appropriately in the range from 50 to 140° C., preferably from 60 to 120° C. and more preferably from 65 to 110° C.

Examples of suitable initiators (C) whose decomposition half-life in the temperature range from 50 to 140° C. is from 20 to 500 min are:

O-$C_2$-$C_{12}$-acylated derivatives of tert-$C_4$-$C_{12}$-alkyl hydroperoxides and tert-($C_9$-$C_{12}$-aralkyl) hydroperoxides, such as tert-butyl peroxyacetate, tert-butyl monoperoxymaleate, tert-butyl peroxyisobutyrate, tert-butyl peroxypivalate, tert-butyl peroxyneoheptanoate, tert-butyl peroxy-2-ethylhexanoate, tert-butyl peroxy-3,5,5-trimethylhexanoate, tert-butyl peroxyneodecanoate, tert-amyl peroxypivalate, tert-amyl peroxy-2-ethylhexanoate, tert-amyl peroxyneodecanoate, 1,1,3,3-tetramethylbutyl peroxyneodecanoate, cumyl peroxyneodecanoate, tert-butyl peroxybenzoate, tert-amyl peroxybenzoate and di-tert-butyl diperoxyphthalate;

di-O-$C_4$-$C_{12}$-acylated derivatives of tert-$C_8$-$C_{14}$-alkylene bisperoxides, such as 2,5-dimethyl-2,5-di(2-ethylhexanoylperoxy)hexane, 2,5-dimethyl-2,5-di(benzoylperoxy)hexane and 1,3-di(2-neodecanoylperoxyisopropyl)benzene;

di($C_2$-$C_{12}$-alkanoyl) and dibenzoyl peroxides, such as diacetyl peroxide, dipropionyl peroxide, disuccinyl peroxide, dicapryloyl peroxide, di(3,5,5-trimethylhexanoyl) peroxide, didecanoyl peroxide, dilauroyl peroxide, dibenzoyl peroxide, di(4-methylbenzoyl) peroxide, di(4-chlorobenzoyl) peroxide and di(2,4-dichlorobenzoyl) peroxide;

tert-$C_4$-$C_5$-alkyl peroxy($C_4$-$C_{12}$-alkyl)carbonates, such as tert-amyl peroxy(2-ethyl-hexyl)carbonate;

di($C_2$-$C_{12}$-alkyl) peroxydicarbonates, such as di(n-butyl) peroxydicarbonate and di(2-ethylhexyl) peroxydicarbonate.

Depending on the mean polymerization temperature, examples of particularly suitable initiators (C) are:

at a mean polymerization temperature of from 50 to 60° C.: tert-butyl peroxyneoheptanoate, tert-butyl peroxyneodecanoate, tert-amyl peroxypivalate, tert-amyl peroxyneodecanoate, 1,1,3,3-tetramethylbutyl peroxyneodecanoate, cumyl peroxyneodecanoate, 1,3-di(2-neodecanoyl peroxyisopropyl)benzene, di(n-butyl) peroxydicarbonate and di(2-ethylhexyl) peroxydicarbonate;

at a mean polymerization temperature of from 60 to 70° C.: tert-butyl peroxypivalate, tert-butyl peroxyneoheptanoate, tert-butyl peroxyneodecanoate, tert-amyl peroxypivalate and di(2,4-dichlorobenzoyl) peroxide;

at a mean polymerization temperature of from 70 to 80° C.: tert-butyl peroxypivalate, tert-butyl peroxyneoheptanoate, tert-amyl peroxypivalate, dipropionyl peroxide, dicapryloyl peroxide, didecanoyl peroxide, dilauroyl peroxide, di(2,4-dichlorobenzoyl) peroxide and 2,5-dimethyl-2,5-di(2-ethylhexanoylperoxy)hexane;

at a mean polymerization temperature of from 80 to 90° C.: tert-butyl peroxyisobutyrate, tert-butyl peroxy-2-ethylhexanoate, tert-amyl peroxy-2-ethylhexanoate, dipropionyl peroxide, dicapryloyl peroxide, didecanoyl peroxide, dilauroyl peroxide, di(3,5,5-trimethylhexanoyl) peroxide, dibenzoyl peroxide and di(4-methylbenzoyl) peroxide;

at a mean polymerization temperature of from 90 to 100° C.: tert-butyl peroxyisobutyrate, tert-butyl peroxy-2-ethylhexanoate, tert-butyl monoperoxymaleate, tert-amyl peroxy-2-ethylhexanoate, dibenzoyl peroxide and di(4-methylbenzoyl) peroxide;

at a mean polymerization temperature of from 100 to 110° C.: tert-butyl monoperoxymaleate, tert-butyl peroxyisobutyrate and tert-amyl peroxy(2-ethylhexyl)carbonate;

at a mean polymerization temperature of from 110 to 120° C.: tert-butyl monoperoxymaleate, tert-butyl peroxy-3,5,5-trimethylhexanoate and tert-amyl peroxy(2-ethylhexyl)carbonate.

Preferred initiators (C) are O-$C_4$-$C_{12}$-acylated derivatives of tert-$C_4$-$C_5$-alkyl hydroperoxides, particular preference being given to tert-butyl peroxypivalate and tert-butyl peroxy-2-ethylhexanoate.

Particularly advantageous polymerization conditions can be established effortlessly by precise adjustment of initiator (C) and polymerization temperature. For instance, the preferred mean polymerization temperature in the case of use of tert-butyl peroxypivalate is from 60 to 80° C., and, in the case of tert-butyl peroxy-2-ethylhexanoate, from 80 to 100° C.

The inventive polymerization reaction can be carried out in the presence of, preferably small amounts of, an organic solvent (D). It is of course also possible to use mixtures of different solvents (D). Preference is given to using water-soluble or water-miscible solvents.

When a solvent (D) is used as a diluent, generally from 1 to 40% by weight, preferably from 1 to 35% by weight, more preferably from 1.5 to 30% by weight, most preferably from 2 to 25% by weight, based in each case on the sum of the components (A), (B1), optionally (B2), and (C), are used.

Examples of suitable solvents (D) include:

monohydric alcohols, preferably aliphatic $C_1$-$C_{16}$-alcohols, more preferably aliphatic $C_2$-$C_{12}$-alcohols, most preferably $C_2$-$C_4$-alcohols, such as ethanol, propanol, isopropanol, butanol, sec-butanol and tert-butanol;

polyhydric alcohols, preferably $C_2$-$C_{10}$-diols, more preferably $C_2$-$C_6$-diols, most preferably $C_2$-$C_4$-alkylene glycols, such as ethylene glycol, 1,2-propylene glycol and 1,3-propylene glycol;

alkylene glycol ethers, preferably alkylene glycol mono ($C_1$-$C_{12}$-alkyl) ethers and alkylene glycol di($C_1$-$C_6$-alkyl) ethers, more preferably alkylene glycol mono- and di($C_1$-$C_2$-alkyl) ethers, most preferably alkylene glycol mono($C_1$-$C_2$-alkyl) ethers, such as ethylene glycol monomethyl and-ethyl ether and propylene glycol monomethyl and-ethyl ether;

polyalkylene glycols, preferably poly($C_2$-$C_4$-alkylene) glycols having 2-20 $C_2$-$C_4$-alkylene glycol units, more preferably polyethylene glycols having 2-20 ethylene glycol units and polypropylene glycols having 2-10 propylene glycol units, most preferably polyethylene glycols having 2-15 ethylene glycol units and polypropylene glycols having 2-4 propylene glycol units, such as diethylene glycol, triethylene glycol, dipropylene glycol and tripropylene glycol;

polyalkylene glycol monoethers, preferably poly($C_2$-$C_4$-alkylene) glycol mono($C_1$-$C_{25}$-alkyl) ethers having 2-20 alkylene glycol units, more preferably poly($C_2$-$C_4$-alkylene) glycol mono($C_1$-$C_{20}$-alkyl) ethers having 2-20 alkylene glycol units, most preferably poly($C_2$-$C_3$-alkylene) glycol mono($C_1$-$C_{16}$-alkyl) ethers having 3-20 alkylene glycol units;

carboxylic esters, preferably $C_1$-$C_6$-alkyl esters of $C_1$-$C_6$-carboxylic acids, more preferably $C_1$-$C_4$-alkyl esters of $C_1$-$C_3$-carboxylic acids, most preferably $C_2$-$C_4$-alkyl esters of $C_2$-$C_3$-carboxylic acids, such as ethyl acetate and ethyl propionate;

aliphatic ketones which preferably have from 3 to 10 carbon atoms, such as acetone, methyl ethyl ketone, diethyl ketone and cyclohexanone;

cyclic ethers, in particular tetrahydrofuran and dioxane.

The solvents (D) are advantageously those solvents, which are also used to formulate the inventive graft polymers for use (for example in washing and cleaning compositions) and can therefore remain in the polymerization product.

Preferred examples of these solvents are polyethylene glycols having 2-15 ethylene glycol units, polypropylene glycols having 2-6 propylene glycol units and in particular alkoxylation products of $C_6$-$C_8$-alcohols (alkylene glycol monoalkyl ethers and polyalkylene glycol monoalkyl ethers).

Particular preference is given here to alkoxylation products of $C_6$-$C_{16}$-alcohols with a high degree of branching, which allow the formulation of polymer mixtures which are free-flowing at 40-70° C. and have a very low polymer content at comparatively low viscosity. The branching may be present in the alkyl chain of the alcohol and/or in the polyalkoxylate moiety (copolymerization of at least one propylene oxide, butylene oxide or isobutylene oxide unit). Particularly suitable examples of these alkoxylation products are 2-ethylhexanol or 2-propylheptanol alkoxylated with 1-15 mol of ethylene oxide, $C_{13}$/$C_{15}$ oxo alcohol or $C_{12}$/$C_{14}$ or $C_{16}$/$C_{18}$ fatty alcohol alkoxylated with 1-15 mol of ethylene oxide and 1-3 mol of propylene oxide, preference being given to 2-propylheptanol alkoxylated with 1-15 mol of ethylene oxide and 1-3 mol of propylene oxide.

In the process according to the invention, block copolymer backbone (A), graft monomer (B1) and, if appropriate, (B2), initiator (C) and, if appropriate, solvent (D) are usually heated to the selected mean polymerization temperature in a reactor.

According to the invention, the polymerization is carried out in such a way that an excess of polymer (block copolymer backbone (A) and formed graft polymer (B)) is constantly present in the reactor. The quantitative ratio of polymer to ungrafted monomer and initiator is generally ≥10:1, preferably ≥15:1 and more preferably ≥20:1.

The polymerization process according to the invention can in principle be carried out in various reactor types.

The reactor used is preferably a stirred tank in which the block copolymer backbone (A), if appropriate together with portions, of generally up to 15% by weight of the particular total amount, of graft monomers (B1) or (B2), initiator (C) and solvent (D), are initially charged fully or partly and heated to the polymerization temperature, and the remaining amounts of (B), (C) and, if appropriate, (D) are metered in, preferably separately. The remaining amounts of (B), (C) and, if appropriate, (D) are metered in preferably over a period of >2 h, more preferably of 4 h and most preferably of 5 h.

In the case of the particularly preferred, substantially solvent-free process variant, the entire amount of block copolymer backbone (A) is initially charged as a melt and the graft monomers (B1) and, if appropriate, (B2), and also the initiator (C) present preferably in the form of a from 10 to 50% by weight solution in one of the solvents (D), are metered in, the temperature being controlled such that the selected polymerization temperature, on average during the polymerization, is maintained with a range of especially +/−10° C., in particular +/−5° C.

In a further particularly preferred, low-solvent process variant, the procedure is as described above, except that solvent (D) is metered in during the polymerization in order to limit the viscosity of the reaction mixture. It is also possible to commence with the metered addition of the solvent only at a later time with advanced polymerization, or to add it in portions.

The polymerization can be affected under standard pressure or at reduced or elevated pressure. When the boiling point of the monomers (B1) or (B2) or of any diluent (D) used is exceeded at the selected pressure, the polymerization is carried out with reflux cooling.

Another subject-matter of the present invention is the use of at least one graft polymer as described above in laundry detergents, in cleaning compositions and/or in fabric and home care products.

A further subject-matter of the present invention is a laundry detergent, a cleaning composition and/or a fabric and home care product containing at least one graft polymer as described above.

Laundry detergents, cleaning compositions and/or fabric and home care products as such are known to a person skilled in the art. Any composition etc. known to a person skilled in the art, in connection with the respective use, can be employed within the context of the present invention.

The laundry detergent, the cleaning composition and/or the fabric and home care product according to the present invention are preferred, wherein the at least one graft polymer is present in an amount ranging from about 0.01% to about 20%, preferably from about 0.05% to 15%, more preferably from about 0.1% to about 10%, and most preferably from about 0.5% to about 5%, in relation to the total weight of such composition or product.

In addition, the laundry detergents and cleaning compositions generally comprise surfactants and, if appropriate, other polymers as washing substances, builders and further customary ingredients, for example cobuilders, complexing agents, bleaches, standardizers, graying inhibitors, dye transfer inhibitors, enzymes and perfumes.

The graft polymers of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1 to 30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is preferably used at levels ranging from about 9% to about 25%, or from about 13% to about 25%, or from about 15% to about 23% by weight of the composition.

The surfactant system may comprise from 0% to about 15%, or from about 0.1% to about 7%, or from about 1% to about 4% by weight of the composition of one or more of co-surfactants selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_X$, wherein x is from 1 to 30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1 to 30; $C_{10}$-$C_{18}$ alkyl alkoxy carboxylates comprising 1 to 5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relate to compositions comprising the inventive graft polymers and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit dose forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silver care, anti-tarnish and/or anti-corrosion agents, dyes, fillers, alkalinity sources, hydrotropes, antioxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention. As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

Another subject-matter of the present invention is the use of at least one graft polymer in laundry detergents, in cleaning compositions and/or in fabric and home care products, wherein the graft polymer comprises
  (A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, and
  (B) polymeric sidechains grafted onto the block copolymer backbone, wherein said polymeric sidechains (B) are obtainable by polymerization of at least one vinyl ester monomer (B1) selected from vinyl acetate or vinyl propionate and optionally N-vinylpyrrolidone as optional further monomer (B2).

Within this specific subject-matter of the present invention, it is preferred that the number (x) of individual blocks within the block copolymer backbone (A) is an integer, wherein x has a value from 2 to 10, preferably x has a value from 2 to 5, more preferably x is 2 or 3, most preferably x is 3.

Furthermore, this specific subject-matter also includes all preferred, more preferred etc. definitions/features as mentioned above in connection with the definition of the graft polymer as such as well under the provisio that the at least one vinyl ester monomer (B1) is selected from vinyl acetate or vinyl propionate.

A further subject-matter of the present invention is, therefore, a laundry detergent, a cleaning composition and/or a fabric and home care product containing at least one graft polymer comprising:
  (A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, and
  (B) polymeric sidechains grafted onto the block copolymer backbone, wherein said polymeric sidechains (B) are obtainable by polymerization of at least one vinyl ester monomer (B1) selected from vinyl acetate or vinyl propionate and optionally N-vinylpyrrolidone as optional further monomer (B2).

It is preferred, that within the respective laundry detergent, cleaning composition and/or fabric and home care product, the at least one graft polymer is present in an amount ranging from about 0.01% to about 20%, preferably from about 0.05% to 15%, more preferably from about 0.1% to about 10%, and most preferably from about 0.5% to about 5%, in relation to the total weight of such composition or product.

A further embodiment of the present invention relates to a graft polymer comprising:
  (A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, and
  (B) polymeric sidechains grafted onto the block copolymer backbone, wherein said polymeric sidechains (B) are obtainable by polymerization of at least one vinyl ester monomer (B1) and optionally N-vinylpyrrolidone as optional further monomer (B2).

Within this specific embodiment of the present invention, it is preferred that the number (x) of individual blocks within the block copolymer backbone (A) is an integer, wherein x has a value from 2 to 10, preferably x has a value from 2 to 5, more preferably x is 2 or 3, most preferably x is 3. Furthermore, this specific embodiment also includes all preferred, more preferred etc. definitions/features as mentioned above in connection with other embodiments of the present invention as well.

The following specific embodiments are encompassed by the present invention as particularly preferred embodiments, with the various further options being disclosed in this present specification as "optional", "preferred", "more preferred", "even more preferred" or "most preferred" options and selections/preferences to be combined within any of the following embodiments, such combinations being included as either each individual option or preference being either included alone or in combination with at least one of any other options and/or preferences; thus, all possible combinations of those are specifically encompassed by this present invention.

Embodiment 1

A graft polymer comprising:
(A) a block copolymer backbone as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x has a value from 3 to 5, more preferably x is 3, and
(B) polymeric sidechains grafted onto the block copolymer backbone, wherein said polymeric sidechains (B) are obtainable by polymerization of at least one vinyl ester monomer (B1) and optionally N-vinylpyrrolidone as optional further monomer (B2).

Embodiment 2

The graft polymer according to embodiment 1, comprising 20 to 95% by weight of the block copolymer backbone (A) and 5 to 80% by weight of the polymeric sidechains (B) (in relation to the total weight of the graft polymer), preferably the graft polymer comprises 40 to 85% by weight, more preferably 50 to 75% by weight of the block copolymer backbone (A), and preferably 15 to 60% by weight, more preferably 25 to 50% by weight of the polymeric sidechains (B) (in relation to the total weight of the graft polymer).

Embodiment 3

The graft polymer according to embodiment 1 or 2, wherein the block copolymer backbone (A) is obtainable by polymerization of
i) at least two monomers selected from the group of ethylene oxide, 1,2-propylene oxide or 1,2-butylene oxide, preferably by polymerization of ethylene oxide and 1,2-propylene oxide as monomers, and/or
ii) one of the at least two monomers employed is ethylene oxide, preferably the second monomer employed is 1,2-propylene oxide, and/or iii) the number (x) of individual blocks within the block copolymer backbone (A) is an integer, wherein x has a value from 3 to 5, more preferably x is 3.

Embodiment 4

The graft polymer according to any of embodiments 1 to 3, wherein
i) the graft polymer has a weight average molecular weight $M_n$ of from 1000 to 100 000 g/mol, preferably from 2000 to 45000 g/mol and more preferably from 3000 to 30 000 g/mol, and/or
ii) the graft polymer has a polydispersity $M_w/M_n$ of <3, preferably <2.5, more preferably <2.3, and most preferably in the range from 1.0 to 2.2 (with $M_w$=weight average molecular weight and $M_n$=number average molecular weight [$^g/_{mol}$/$^g/_{mol}$]), and/or
iii) the block copolymer backbone (A) is optionally capped at one or both end groups, preferably the block copolymer backbone (A) is not capped at both end groups or, if the block copolymer backbone (A) is capped, the capping is done by $C_1$-$C_{25}$-alkyl groups, and/or
iv) the block copolymer backbone (A) is a triblock copolymer of polyethylene oxide (PEG) and polypropylene oxide (PPG).

Embodiment 5

The graft polymer according to any of embodiments 1 to 4, wherein the block copolymer backbone (A) has the structure according to formula (A1) or formula (A2) with formula (A1) is defined as follows:

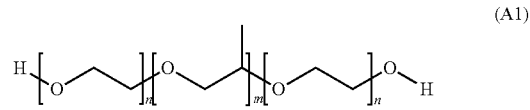

(A1)

with
n is an integer in the range of 2 to 100, preferably of 3 to 80, and
m is an integer in the range of 2 to 100, preferably of 10 to 70, more preferably of 14 to 54, or
formula (A2) is defined as follows:

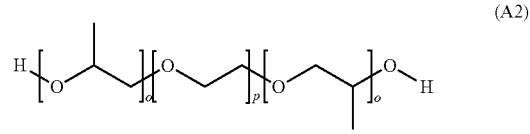

(A2)

with
o is an integer in the range of 2 to 100, preferably of 5 to 50, more preferably of 8 to 27, and
p is an integer in the range of 2 to 100, preferably of 5 to 50, more preferably of 7 to 24.

Embodiment 6

The graft polymer according to any of embodiments 1 to 4, wherein the polymeric sidechains (B) are obtained by radical polymerization and/or the at least one vinyl ester monomer (B1) is vinyl acetate or vinyl propionate, more preferably vinyl acetate.

Embodiment 7

The graft polymer according to any of embodiments 1 to 6, wherein
i) the polymeric sidechains (B) are obtainable by polymerization in the presence of N-vinylpyrrolidone as further monomer (B2), and/or
ii) the polymeric sidechains (B) are fully or partially hydrolyzed after polymerization, preferably to an extent of up to 50% in relation to the amount of the at least one vinyl ester monomer (B1) employed within the polymerization.

Embodiment 8

The graft polymer according to any of embodiments 1 to 7, wherein the polymeric sidechains (B) are obtained by radical polymerization of
(B1) 25 to 100% by weight (in relation to the sum of (B1) and (B2)) of at least one vinyl ester monomer (B1), preferably 50 to 100% by weight, more preferably 75 to 100% by weight, and
(B2) 0 to 75% by weight (in relation to the sum of (B1) and (B2)) of N-vinylpyrrolidone as further monomer (B2), preferably 0 to 50% by weight, more preferably 0 to 25% by weight.

Embodiment 9

The graft polymer according to any of embodiments 1 to 8, wherein the polymeric sidechains (B) are obtained by radical polymerization of 100% by weight (in relation to the total amount of monomers employed) of at least one vinyl ester monomer (B1), which is preferably vinyl acetate or vinyl propionate, more preferably vinyl acetate.

Embodiment 10

Graft polymer according to any of embodiments 1 to [[9, wherein the number average molecular weight $M_n$ of the triblockcopolymer backbone (A) is lower than 6000 g/mol, preferably lower than 5000 g/mol, more preferably lower than 3650 g/mol and even more preferably lower than 3000 g/mol.

Embodiment 11

Graft polymer according to any of embodiments 1 to 10, wherein the weight percentage of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer).

Embodiment 12

Graft polymer according to any of embodiments 1-11, wherein the backbone has the structure A2.

Embodiment 13

Graft polymer according to any of embodiments 1 to 12, wherein the weight percentage of ethylene oxide (EO) in the backbone of at least 10% and not more than 80%, preferably at least 20%, and preferably not more than 70%.

Embodiment 14

Graft polymer according to any of embodiments 1 to 9 wherein the number average molecular weight $M_n$ of the triblockcopolymer backbone (A) is lower than 6000 g/mol, preferably lower than 5000 g/mol, more preferably lower than 3650 g/mol and even more preferably lower than 3000 g/mol, and
the weight percentage of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer).

Embodiment 15

Graft polymer according to any of embodiments 1 to 9 wherein the number average molecular weight $M_n$ of the triblockcopolymer backbone (A) is lower than 6000 g/mol, preferably lower than 5000 g/mol, more preferably lower than 3650 g/mol and even more preferably lower than 3000 g/mol, and most preferably lower than 2500 g/mol, and the backbone has the structure A2.

Embodiment 16

Graft polymer according to any of embodiments 1 to 9 wherein the number average molecular weight $M_n$ of the tri-block copolymer backbone (A) is lower than 6000 g/mol, preferably lower than 5000 g/mol, more preferably lower than 3650 g/mol and even more preferably lower than 3000 g/mol, and most preferably lower than 2500 g/mol, and
the backbone has the structure A2, and
the weight percentage of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer).

Embodiment 17

Graft polymer according to any of embodiments 1 to 9 wherein
the number average molecular weight $M_n$ of the triblockcopolymer backbone (A) is lower than 6000 g/mol, preferably lower than 5000 g/mol, more preferably lower than 3650 g/mol and even more preferably lower than 3000 g/mol, and most preferably lower than 2500 g/mol and
the backbone has the structure A2, and
the weight percentage of vinyl acetate (monomer B) being grafted onto the backbone is in between 10 and 80, preferably more than 10 and less than 80, more preferably at least 20, and most preferably at least 30, and preferably less than 70, more preferably less than 60 and most preferably less than 50 (in relation to the total weight of the graft polymer), and the weight percentage of ethylene oxide (EO) in the backbone of at least 10% and not more than 80%, preferably at least 20%, and preferably not more than 70%.

Embodiment 18

A process for obtaining at least one graft polymer according to any of embodiments 1 to 17, wherein at least one monomer (B1) and optionally N-vinylpyrrolidone as optional further monomer (B2) are polymerized in the presence of at least one block copolymer backbone (A).

Embodiment 19

The process according to embodiment 18, wherein the polymeric sidechains (B) are obtained by radical polymerization.

Embodiment 20

The process according to embodiment 18 or 19, comprising the polymerization of at least one monomer (B1) selected from vinyl acetate or vinyl propionate and optionally at least one further monomer (B2) which is N-vinylpyrrolidone in order to obtain the polymer sidechains (B) in the presence of at least one block copolymer backbone (A), a free radical-forming initiator (C) and, if desired, up to 50% by weight, based on the sum of components (A), (B1), optionally (B2), and (C) of at least one organic solvent (D), at a mean polymerization temperature at which the initiator (C) has a decomposition half-life of from 40 to 500 min, in such a way that the fraction of unconverted graft monomers (B1) and optionally (B2) and initiator (C) in the reaction mixture is constantly kept in a quantitative deficiency relative to the block copolymer backbone (A).

Embodiment 21

Use of at least one graft polymer according to any of embodiments 1 to 17 or obtainable by a process according to any of the embodiments 18 to 21 in laundry detergents, in cleaning compositions and/or in fabric and home care products.

Embodiment 22

A laundry detergent, a cleaning composition and/or a fabric and home care product containing at least one graft polymer according to any of embodiments 1 to 17 or obtainable by a process according to any of the embodiments 18 to 21.

Embodiment 23

The laundry detergent, the cleaning composition and/or the fabric and home care product according to embodiment 22, wherein the at least one graft polymer is present in an amount ranging from about 0.01% to about 20%, preferably from about 0.05% to 15%, more preferably from about 0.1% to about 10%, and most preferably from about 0.5% to about 5%, in relation to the total weight of such composition or product.

The following examples shall further illustrate the present invention without restricting the scope of the invention.

EXAMPLES

Polymer Measurements

K-value measures the relative viscosity of dilute polymer solutions and is a relative measure of the average molecular weight. As the average molecular weight of the polymer increases for a particular polymer, the K-value tends to also increase. The K-value is determined in a 3% by weight NaCl solution at 23° C. and a polymer concentration of 1% polymer according to the method of H. Fikentscher in "Cellulosechemie", 1932, 13, 58.

The number average molecular weight ($M_n$), the weight average molecular weight ($M_w$) and the polydispersity $M_w/M_n$ of the inventive graft polymers were determined by gel permeation chromatography in tetrahydrofuran. The mobile phase (eluent) used was tetrahydrofuran comprising 0.035 mol/L diethanolamine. The concentration of graft polymer in tetrahydrofuran was 2.0 mg per mL. After filtration (pore size 0.2 μm), 100 μL of this solution were injected into the GPC system. Four different columns (heated to 60° C.) were used for separation (SDV precolumn, SDV 1000A, SDV 100000A, SDV 1000000A). The GPC system was operated at a flow rate of 1 mL per min. A DRI Agilent 1100 was used as the detection system. Poly (ethylene glycol) (PEG) standards (PL) having a molecular weight $M_n$ from 106 to 1.378000 g/mol were used for the calibration.

The following (general) procedures were performed using the material and ratios and amounts as further indicated in table 1.

Procedure for Comparative Example 1: Graft Polymerization of Vinyl Acetate on Poly(Ethylene Glycol)—(Comp.Ex.1)

A polymerization vessel equipped with stirrer and reflux condenser was initially charged with 600 g of poly(ethylene glycol) under nitrogen atmosphere and melted at 90° C.

Feed 1 containing 4.8 g of tert-butyl peroxy-2-ethylhexanoate, dissolved in 23.6 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (400 g of vinyl acetate) was started and dosed within 6:00 h at constant feed rate and 90° C. Upon completion of the Feeds 1 and 2, the temperature was increased to 95° C. and Feed 3 consisting of 3.16 g of tert-butyl peroxy-2-ethylhexanoate, dissolved in 15.70 g of tripropylene glycol, were dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar.

General Procedure for Comparative Polymers without Grafting

Comparative Examples 9-12

1098.90 g of triblock copolymer, 1.10 g vinyl acetate and 58.30 g of 1,2-propanediol were mixed in a polymerization vessel at 90° C. and stirred for 3 h.

General Procedure 1 for Graft Polymerization of Vinyl Acetate in a Ratio of Polyalkylene Oxide/VAc (60/40)—(Ex. 1, Ex. 3—Ex. 5, Ex. 7, Ex. 16, Ex. 18—Ex. 20; Comp. Ex. 2, Comp. Ex. 3, Comp. Ex. 6)

A polymerization vessel equipped with stirrer and reflux condenser was initially charged with 600 g of triblock copolymer under nitrogen atmosphere and melted at 90° C.

Feed 1 containing 4.8 g of tert-butyl peroxy-2-ethylhexanoate, dissolved in 23.6 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (400 g of vinyl acetate) was started and dosed within 6:00 h at constant feed rate and 90° C. Upon completion of the Feeds 1 and 2, the temperature was increased to 95° C. and Feed 3 consisting of 3.16 g of tert-butyl peroxy-2-ethylhexanoate, dissolved in 15.70 g of tripropylene glycol, were dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar. The resulting graft polymer (Ex. 7) had a mean molecular weight $M_w$ of 5190 g/mol and a polydispersity of 1.5.

General Procedure 2 for Graft Polymerization of Vinyl Acetate in a Ratio of Polyalkylene Oxide/VAc (40/60) (Ex. 2, Ex. 6, Ex. 14, Comp. Ex. 7, Comp. Ex. 8)

A polymerization vessel equipped with stirrer and reflux condenser was initially charged with 440 g of triblock copolymer under nitrogen atmosphere and melted at 90° C.

Feed 1 containing 7.97 g of tert-butyl peroxy-2-ethylhexanoate, dissolved in 35.09 g of 1,2-propanediol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (660 g of vinyl acetate) was started and dosed to the reaction vessel within 6:00 h at constant feed rate and 90° C. Upon completion of the feeds, Feed 3 consisting of 5.28 g of tert-butyl peroxy-2-ethylhexanoate, dissolved in 23.21 g of 1,2-propanediol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

General Procedure 3 for Graft Polymerization of Vinyl Acetate in a Ratio of Polyalkylene Oxide/VAc (70/30)—(Ex. 8, Ex. 22, Comp. Ex. 4)

A polymerization vessel equipped with stirrer and reflux condenser was initially charged with 770 g of triblock copolymer under nitrogen atmosphere and melted at 90° C.

Feed 1 containing 7.97 g of tert-butyl peroxy-2-ethylhexanoate, dissolved in 35.09 g of 1,2-propanediol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (330 g of vinyl acetate) was started and dosed to the reaction vessel within 6:00 h at constant feed rate and 90° C. Upon completion of the feeds, Feed 3 consisting of 5.28 g of tert-butyl peroxy-2-ethylhexanoate, dissolved in 23.21 g of 1,2-propanediol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Procedure for Graft Polymerization of Vinyl Acetate in a Ratio of Polyalkylene Oxide/VAc (90/10)—(Ex. 9)

A polymerization vessel equipped with stirrer and reflux condenser was initially charged with 990 g of triblock copolymer under nitrogen atmosphere and melted at 90° C.

Feed 1 containing 7.97 g of tert-butyl peroxy-2-ethylhexanoate, dissolved in 35.09 g of 1,2-propanediol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (110 g of vinyl acetate) was started and dosed to the reaction vessel within 6:00 h at constant feed rate and 90° C. Upon completion of the feeds, Feed 3 consisting of 5.28 g of tert-butyl peroxy-2-ethylhexanoate, dissolved in 23.21 g of 1,2-propanediol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Procedure for Graft Polymerization of Vinyl Acetate and Vinyl Pyrrolidone in Tripropylene Glycol—(Ex. 10)

A polymerization vessel equipped with stirrer and reflux condenser was initially charged with 300 g of triblock copolymer under nitrogen atmosphere and melted at 90° C.

Feed 1 containing 6.92 g of tert-butyl peroxy-2-ethylhexanoate, dissolved in 58.5 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (180.00 g of vinyl acetate) and Feed 3 (120.00 g of vinyl pyrrolidone) were started simultaneously and dosed to the reaction vessel within 6:00 h at constant feed rate and 90° C. Upon completion of the feeds the temperature was increased to 95° C. and Feed 4 consisting of 1.22 g of tert-butyl peroxy-2-ethylhexanoate, dissolved in 10.38 g of tripropylene glycol, was dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar. Water (512.40 g) was added.

Procedure for Graft Polymerization of Vinyl Acetate and Vinyl Pyrrolidone in 1,2-Propanediol (Ex. 11)

A polymerization vessel equipped with stirrer and reflux condenser was initially charged with 376.3 g of triblock copolymer under nitrogen atmosphere and melted at 90° C.

Feed 1 containing 7.12 g of tert-butyl perpivalate, dissolved in 17.01 g of 1,2-propanediol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (225.78 g of vinyl acetate) and Feed 3 (150.25 g of vinyl pyrrolidone) were started simultaneously and dosed to the reaction vessel within 6:00 h at constant feed rate and 90° C. 3 h after the start of Feeds 2 and 3, Feed 4 (142.31 g 1,2-propanediol) was started and dosed to the reaction vessel in 3 h with constant feed rate. Upon completion of the feeds the temperature was increased to 95° C. and Feed 3 consisting of 4.72 g of tert-butyl perpivalate, dissolved in 11.25 g of 1,2-propanediol, was dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar. Water (76.84 g) was added.

Procedure for Graft Polymerization of Vinyl
Acetate and Vinyl Pyrrolidone in Tripropylene
Glycol Followed by Partial Hydrolysis of (Former)
Vinyl Acetate (VAc) Units after
Polymerization—(Ex. 12)

A polymerization vessel equipped with stirrer and reflux condenser was initially charged with 300 g of triblock copolymer under nitrogen atmosphere and melted at 90° C.

Feed 1 containing 6.92 g of tert-butyl peroxy-2-ethylhexanoate, dissolved in 58.5 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (180.00 g of vinyl acetate) and Feed 3 (120.00 g of vinyl pyrrolidone) were started simultaneously and dosed to the reaction vessel within 6:00 h at constant feed rate and 90° C. Upon completion of the feeds the temperature was increased to 95° C. and Feed 4 consisting of 1.22 g of tert-butyl peroxy-2-ethylhexanoate, dissolved in 10.38 g of tripropylene glycol, was dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar. Water (512.40 g) was added and the temperature was reduced to 80° C. Sodium hydroxide solution (50%, 68.0 g) was added and the mixture was stirred at 80° C. for 60 min.

Procedure for Graft Polymerization of Vinyl
Acetate and Vinyl Pyrrolidone in 1,2-Propanediol
Followed by Partial Hydrolysis of (Former) Vinyl
Acetate (VAc) Units after Polymerization (Ex. 13)

A polymerization vessel equipped with stirrer and reflux condenser was initially charged with 376.3 g of triblock copolymer under nitrogen atmosphere and melted at 90° C.

Feed 1 containing 7.12 g of tert-butyl perpivalate, dissolved in 17.01 g of 1,2-propanediol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (225.78 g of vinyl acetate) and Feed 3 (150.25 g of vinyl pyrrolidone) were started simultaneously and dosed to the reaction vessel within 6:00 h at constant feed rate and 90° C. 3 h after the start of Feeds 2 and 3, Feed 4 (142.31 g 1,2-propanediol) was started and dosed to the reaction vessel in 3 h with constant feed rate. Upon completion of the feeds the temperature was increased to 95° C. and Feed 3 consisting of 4.72 g of tert-butyl perpivalate, dissolved in 11.25 g of 1,2-propanediol, was dosed within 56 min with constant flow rate at 95° C. The mixture was stirred for one hour at 95° C. upon complete addition of the feed.

Residual amounts of monomer were removed by vacuum distillation for 1 h at 95° C. and 500 mbar. Water (76.84 g) was added and the temperature was reduced to 80° C. Sodium hydroxide solution (50%, 67.0 g) was added and the mixture was stirred at 80° C. for 60 min.

Procedure for Graft Polymerization of Vinyl
Acetate in a Ratio of Polyalkylene Oxide/VAc
(50/50)—(Ex. 15, Comp. Ex. 5)

A polymerization vessel equipped with stirrer and reflux condenser was initially charged with 500 g of triblock copolymer under nitrogen atmosphere and melted at 90° C.

Feed 1 containing 12.24 g of tert-butyl peroxy-2-ethylhexanoate, dissolved in 50.30 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (200 g of vinyl acetate) was started and dosed to the reaction vessel within 6:00 h at constant feed rate and 90° C. Upon completion of the feeds, Feed 3 consisting of 4.80 g of tert-butyl peroxy-2-ethylhexanoate, dissolved in 19.70 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Procedure for Graft Polymerization of Vinyl
Acetate in a Ratio of Polyalkylene Oxide/VAc
(80/20)—(Ex. 17, Ex. 21, Ex. 23)

A polymerization vessel equipped with stirrer and reflux condenser was initially charged with 800 g of triblock copolymer under nitrogen atmosphere and melted at 90° C.

Feed 1 containing 10.20 g of tert-butyl peroxy-2-ethylhexanoate, dissolved in 47.61 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (200 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 22.39 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Biodegration Testing/Biodegradability

Biodegradation in waste water was tested in triplicate using the OECD 301F manometric respirometry method. 30 mg/mL test substance is inoculated into wastewater taken from Mannheim Wastewater Treatment Plant and incubated in a closed flask at 25° C. for 28 days. The consumption of oxygen during this time is measured as the change in pressure inside the flask using an OxiTop C (WTW). Evolved $CO_2$ is absorbed using an NaOH solution. The amount of oxygen consumed by the microbial population during biodegradation of the test substance, after correction using a blank, is expressed as a % of the ThOD (Theoretical Oxygen Demand).

Performance evaluations of the graft polymers can be obtained by laundry- and cleaning-experiments. Laundry experiments can be performed in washing machines or alternatively in equipment to perform model laundry experiments like Launderometer or Tergotometer. For testing of anti-redeposition effects, white fabrics were washed together with soiled fabrics in presence of a detergent composition containing the graft polymer and the remission of the white fabric is determined before and after the wash. For testing soil removal effects, soiled fabrics were washed in presence of a detergent composition containing the graft polymer and the remission of the soiled fabric is determined before and after the wash. Dosage of the graft polymer was chosen at 0.5 to 5% per weight of the detergent composition. Dosage of detergents was chosen in the range of 1500-4500 ppm in the wash liquor. Water hardness ($Ca^{2+}$ and $Mg^{2+}$ concentration in the wash liquor) in the wash experiments was set between 1 and 3 mmol hardness. Wash temperature was chosen between 20° C. and 40° C.

TABLE 1

| Example | Backbone $M_n$ [g/mol] | Backbone % EO | Block-copolymer structure | Monomers | Composition BB/Monos [Gew. %] | Biodegradation [%], 28 d |
|---|---|---|---|---|---|---|
| Comp. Ex. 1 | 6000 | 100 | PEG | VAc | 40/60 | 28 |
| Comp. Ex. 2 | 5900 | medium (40%) | A1 | VAc | 60/40 | 12 |
| Comp. Ex. 3 | 4600 | medium (40%) | A1 | VAc | 60/40 | 14 |
| Comp. Ex. 4 | 5900 | medium (40%) | A1 | VAc | 70/30 | 14 |
| Comp. Ex. 5 | 3500 | Low (10%) | A1 | Vac | 50/50 | 15 |
| Comp. Ex. 6 | 6500 | medium (50%) | A1 | VAc | 60/40 | 16 |
| Comp. Ex. 7 | 8300 | high (80%) | A1 | VAc | 40/60 | 16 |
| Comp. Ex. 8 | 3650 | Low (20%) | A1 | Vac | 40/60 | 18 |
| Comp. Ex. 9 | 8300 | high (80%) | A1 | VAc | 99.9/0.1 | 80 |
| Comp. Ex. 10 | 2900 | medium (40%) | A1 | VAc | 99.9/0.1 | 83 |
| Comp. Ex. 11 | 2450 | low (20%) | A1 | VAc | 99.9/0.1 | 85 |
| Comp. Ex. 12 | 2000 | low (10%) | A1 | VAc | 99.9/0.1 | 102 |
| Ex. 1 | 3500 | low (10%) | A1 | VAc | 60/40 | 45 |
| Ex. 2 | 2000 | low (10%) | A1 | VAc | 40/60 | 35 |
| Ex. 3 | 2000 | low (10%) | A1 | VAc | 60/40 | 74 |
| Ex. 4 | 1000 | low (10%) | A1 | VAc | 60/40 | 70 |
| Ex. 5 | 1750 | medium (40%) | A1 | VAc | 60/40 | 50 |
| Ex. 6 | 2900 | medium (40%) | A1 | VAc | 40/60 | 32 |
| Ex. 7 | 2900 | medium (40%) | A1 | VAc | 60/40 | 40 |
| Ex. 8 | 8300 | high (80%) | A1 | VAc | 70/30 | 38 |
| Ex. 9 | 8300 | high (80%) | A1 | VAc | 90/10 | 46 |
| Ex. 10 | 2900 | medium (40%) | A1 | VAc/VP | 50/30/20 | 34 |
| Ex. 11 | 2900 | medium (40%) | A1 | VAc/VP | 50/30/20 | 42 |
| Ex.12 | 2900 | medium (40%) | A1 | VAc/VP | 50/30*/20 | 37 |
| Ex.13 | 2900 | medium (40%) | A1 | VAc/VP | 50/30*/20 | 42 |
| Ex.14 | 2650 | medium (40%) | A2 | VAc | 40/60 | 29 |
| Ex. 15 | 2450 | low (20%) | A1 | VAc | 50/50 | 30 |
| Ex. 16 | 2450 | low (20%) | A1 | VAc | 60/40 | 33 |
| Ex. 17 | 2450 | low (20%) | A1 | VAc | 80/20 | 46 |
| Ex. 18 | 3100 | low (20%) | A2 | VAc | 60/40 | 47 |
| Ex. 19 | 2150 | low (20%) | A2 | VAc | 60/40 | 49 |
| Ex. 20 | 2900 | medium (40%) | A1 | VAc | 80/20 | 50 |
| Ex. 21 | 1950 | low (20%) | A2 | VAc | 70/30 | 52 |
| Ex. 22 | 2650 | medium (40%) | A2 | VAc | 80/20 | 57 |
| Ex. 23 | 2650 | medium (40%) | A2 | VAc | 60/40 | 59 |

Abbreviations used:
Ex. = inventive example;
Comp. Ex. = comparative example
VAc = Vinyl acetate;
VP = Vinyl pyrrolidone;
*= 40 mol % of acetate units were hydrolyzed (by employing sodium hydroxide solution) to the respective alcohol Viscosity Measurements Viscosity of the samples was measured using a Brookfield Viscosimeter. For the measurements, the samples were diluted with tripropylene glycol to the solid content indicated in the table 2. The samples were heated to 60° C. and measured using spindle 31 at 30 rpm.

TABLE 2

| Example | Solid content [%] | Viscosity [mPas] |
|---|---|---|
| Ex.23 | 85 | 632 |
| Ex.23 | 80 | 550 |
| Ex.23 | 75 | 360 |
| Ex.23 | 70 | 322 |

Whiteness Performance in Detergents

The whiteness performances was tested using the following conditions: Clay dispersion/whiteness/3000 ppm clay/HDL 750 ppm/25° C./1 mM hardness/15 ppm polymer.

The results are shown in table 3.

TABLE 3

Whiteness

| Ingredients | Delta whiteness index, average over 4 fabrics |
|---|---|
| nil | 100 |
| Comparative example 1 | 147 |
| Example 15 | 138 |

For the whiteness benefit test, the following laundry detergent composition as listed in table 4 was used:

TABLE 4

| Ingredient | % |
|---|---|
| Sodium dodecylbenzenesulfonate | 6.9 |
| Sodium laureth sulfate | 11.3 |
| Lutensol AO7 (C13C15-Oxo alcohol + 7 EO) | 7 |
| Fatty Acid C12-18 | 1 |
| 1,2-Propylene Glycol | 6 |
| Ethanol | 2 |
| Water | balance |

Test Preparation:

The following fabrics are provided for the whiteness benefit test:
NA Polyester: PW19, available from Empirical Manufacturing Company (Cincinnati, OH, Knitted Cotton 1: Test fabrics, Inc 403 cotton interlock knit tubular CW120, available from Empirical Manufacturing Company (Cincinnati, OH, USA).

Polycotton

"Washed and FE Treated" fabrics were prepared according to the following method: 400 g fabrics are washed in a WE Miniwasher (3.5 litre water) twice using the short program (45 minute wash cycle followed by three rinse cycles; total program is 90 minutes) at 60° C. with 18.6 g Ariel™ Compact powder detergent, twice using the short program, at 60° C. nil detergent, and then three times using the short program at 40° C. with 8.2 g Lenor™ Concentrate (a fabric enhancer) into each main wash. Fabrics are then dried in a tumble dryer on extra dry until dry.

"Washed" fabrics were prepared according to the following method: 400 g fabrics are washed in a WE Miniwasher (3.5 litre water) twice using the short program (45 minute wash cycle followed by three rinse cycles; total program is 90 minutes) at 60° C. with 18.6 g Ariel™ Compact powder detergent and twice using the short program, at 60° C. nil detergent. Fabrics are then dried in a tumble dryer on extra dry until dry.

Test Method:

Four fabric samples are prepared: Polycotton, washed; Knitted Cotton, washed; NA Polyester washed and FE treated, Knitted washed and FE treated.

Each sample is run in a 96 well plate simulated washing system that uses magnetized bearings to simulate the agitation of a typical full scale washing machine according to the following conditions: 750 ppm detergent concentration, 150 μL water per well, 25° C., water hardness of 1.0 mM (2:1 Ca+2: Mg+2 molar ratio), wash pH of 8.3, 3000 ppm Arizona test dust (supplied by PTI, Powder Technology Inc).

Each polymer listed in table 5 is added at 15 ppm of the wash solution. Each fabric is washed for 60 minutes and dried in the dark under ambient conditions. For each wash condition, there are two 96 well plates, and eight internal replicates per 96 well plate, for a total of 16 replicates per wash condition.

When the samples are dry, L*, a*, b* and CIE WI are measured on each 96 well plate spot using a Spectrolino imaging system (Gretag Macbeth, Spectro Scan 3.273). For each treatment, the average CIE WI is determined. Delta CIE WI, as reported in Table below, is the difference of the average CIE WI of the sample vs. the average CIE WI of a control sample without the tested polymer.

The whiteness index (WI-index) as determined on several different fibre materials (see following table) was calculated as follow:

"Comparable scaling indicator" (for example listed)= (Sum (WI all fabric tested with technology A)×100)/Sum (all WI fabric tested with nil technology) with this comparison being set at "100" for the test using no graft polymer.

For the whiteness index, the CIE whiteness index formula was used and delta WI was calculated as follows: delta WI on a substrate=WI technology−WI nil.

TABLE 5

WI-Index as determined for several different fabric types

| Inventive Examples | Delta WI | | | | Comparable scaling indicator |
|---|---|---|---|---|---|
| | Polycotton washed | NA Polyester washed and FE treated | cotton washed and FE treated | cotton washed | |
| (without graft polymer) nil | 0 | 0 | 0 | 0 | 100 |
| Ex.1 | 6.3 | 6.4 | 7.5 | 4.1 | 133 |
| Ex.2 | 6.6 | 5.5 | 8.6 | 5.2 | 135 |
| Ex.4 | 3.2 | 3.1 | 6.0 | 1.4 | 118 |
| Ex.5 | 3.9 | 3.1 | 5.1 | 1.4 | 118 |
| Ex.6 | 4.1 | 5.0 | 7.4 | 3.8 | 127 |
| Ex.14 | 7.5 | 6.9 | 8.7 | 4.6 | 137 |
| Ex.15 | 6.8 | 6.4 | 9.4 | 5.6 | 138 |
| Ex.16 | 5.6 | 5.2 | 8.9 | 4.2 | 132 |
| Ex.17 | 4.7 | 3.4 | 6.7 | 5.3 | 127 |
| Ex.18 | 6.4 | 5.6 | 7.0 | 4.1 | 131 |
| Ex.19 | 4.9 | 4.6 | 6.8 | 4.4 | 128 |
| Ex.20 | 4.2 | 3.3 | 5.8 | 2.6 | 121 |
| Ex.21 | 6.9 | 4.5 | 8.3 | 4.3 | 131 |
| Ex.22 | 5.4 | 4.2 | 6.1 | 2.7 | 124 |
| Ex.23 | 7.8 | 5.8 | 7.7 | 5.7 | 135 |

The invention claimed is:

1. A graft polymer comprising:
   (A) a block copolymer backbone as a graft base, wherein said block copolymer backbone (A) is obtainable by polymerization of at least two monomers selected from the group consisting of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x is from 3 to 10, and
   (B) polymeric sidechains grafted onto the block copolymer backbone, wherein said polymeric sidechains (B) are obtainable by polymerization of at least one vinyl ester monomer (B1) and optionally N-vinylpyrrolidone as optional further monomer (B2);
   wherein the block copolymer backbone (A) has a structure according to formula (A2) with formula (A2) defined as follows:

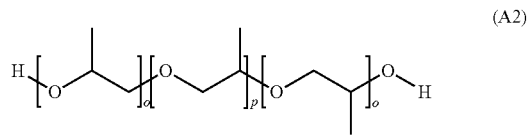

(A2)

with
   o is an integer in the range of 2 to 100, and
   p is an integer in the range of 2 to 100.

2. The graft polymer according to claim 1, comprising 20 to 95% by weight of the block copolymer backbone (A) and 5 to 80% by weight of the polymeric sidechains (B) (in relation to the total weight of the graft polymer).

3. The graft polymer according to claim 1, wherein the block copolymer backbone (A) is obtainable by polymerization of
   i) at least two monomers selected from the group consisting of ethylene oxide, 1,2-propylene oxide or 1,2-butylene oxide, and/or ii) one of the at least two monomers employed is ethylene oxide, and/or
iii) the number (x) of individual blocks within the block copolymer backbone (A) is an integer, wherein x has a value from 3 to 5.

4. The graft polymer according to claim 1, wherein
i) the graft polymer has a weight average molecular weight $M_w$ of from 1,000 to 100,000 g/mol, and/or
ii) the graft polymer has a polydispersity $M_w/M_n$ of <3, (with $M_w$=weight average molecular weight and $M_n$=number average molecular weight [$^g/_{mol}/^g/_{mol}$]), and/or
iii) the block copolymer backbone (A) is optionally capped at one or both endgroups, if the block copolymer backbone (A) is capped, the capping is done by $C_1$-$C_{25}$-alkyl groups, and/or
iv) the block copolymer backbone (A) is a triblock copolymer of polyethylene oxide (PEG) and polypropylene oxide (PPG).

5. The graft polymer according to claim 1, wherein the polymeric sidechains (B) are obtained by radical polymerization and the at least one vinyl ester monomer (B1) is vinyl acetate or vinyl propionate, and i) with optionally N-vinylpyrrolidone as further monomer (B2) being present, and ii) the polymeric sidechains (B) being fully or partially hydrolyzed after polymerization.

6. The graft polymer according to claim 1, wherein the polymeric sidechains (B) are obtained by radical polymerization of
(B1) 25 to 100% by weight (in relation to the sum of (B1) and (B2)) of at least one vinyl ester monomer (B1), and
(B2) 0 to 75% by weight (in relation to the sum of (B1) and (B2)) of N-vinylpyrrolidone as further monomer (B2).

7. The graft polymer according to claim 1, wherein the polymeric sidechains (B) are obtained by radical polymerization of 100% by weight (in relation to the total amount of monomers employed) of at least one vinyl ester monomer (B1).

8. The graft polymer according to claim 5, wherein the number average molecular weight $M_n$ of the tri-block copolymer backbone (A) is lower than 6000 g/mol, and the percentage by weight of the polymeric sidechains (B) being grafted onto the backbone is in between 10 and 80 (in relation to the total weight of the graft polymer).

9. The graft polymer according to claim 5, wherein the number average molecular weight $M_n$ of the tri-block copolymer backbone (A) is lower than 6000 g/mol, and the percentage by weight of the polymeric sidechains (B) being grafted onto the backbone is in between 10 and 80 (in relation to the total weight of the graft polymer).

10. A process for obtaining at least one graft polymer according to claim 1, wherein at least one monomer (B1) and optionally N-vinylpyrrolidone as optional further monomer (B2) are polymerized in the presence of at least one block copolymer backbone (A), wherein the polymeric sidechains (B) are obtained by radical polymerization.

11. The process according to claim 10, comprising the polymerization of at least one monomer (B1) selected from the group consisting of vinyl acetate and vinyl propionate and optionally at least one further monomer (B2) which is N-vinylpyrrolidone in order to obtain the polymer sidechains (B) in the presence of at least one block copolymer backbone (A), a free radical-forming initiator (C) and, if desired, up to 50% by weight, based on the sum of components (A), (B1), optionally (B2), and (C) of at least one organic solvent (D), at a mean polymerization temperature at which the initiator (C) has a decomposition half-life of from 40 to 500 min, in such a way that the fraction of unconverted graft monomers (B1) and optionally (B2) and initiator (C) in the reaction mixture is constantly kept in a quantitative deficiency relative to the block copolymer backbone (A).

12. A method of using the graft polymer according to claim 1, in laundry detergents, in cleaning compositions and/or in fabric and home care products.

13. A laundry detergent, a cleaning composition and/or a fabric and home care product containing at least one graft polymer according to claim 1.

14. The laundry detergent, the cleaning composition and/or the fabric and home care product according to claim 13, wherein the at least one graft polymer is present in an amount ranging from about 0.01% to about 20%, in relation to the total weight of such composition or product.

15. The graft polymer according to claim 1, comprising 40 to 85% by weight of the block copolymer backbone (A) and 15 to 60% by weight of the polymeric sidechains (B) (in relation to the total weight of the graft polymer).

16. The graft polymer according to claim 1, comprising 55 to 75% by weight of the block copolymer backbone (A) and 25 to 45% by weight of the polymeric sidechains (B) (in relation to the total weight of the graft polymer).

* * * * *